UNITED STATES PATENT OFFICE.

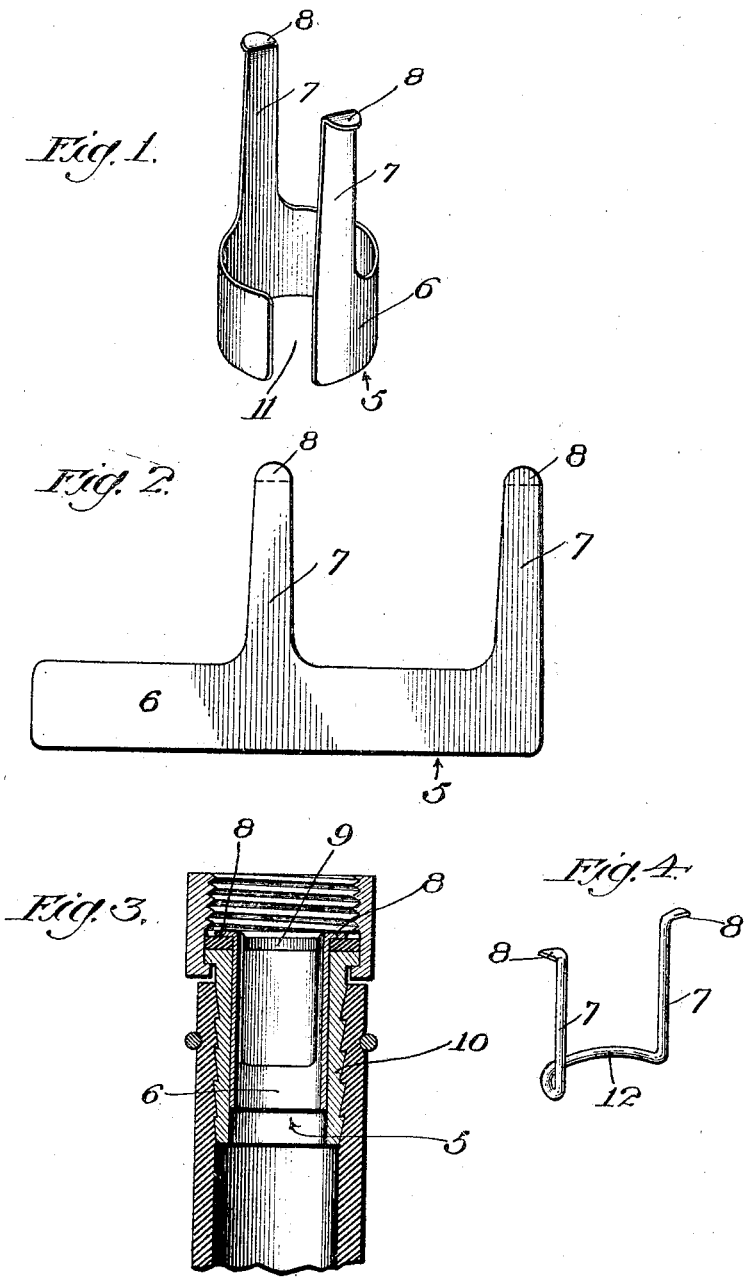

WILLIAM B. WELCH, JR., OF LOS ANGELES, CALIFORNIA.

WASHER-RETAINER.

No. 917,388.

Specification of Letters Patent.

Patented April 6, 1909.

Application filed January 10, 1908. Serial No. 410,110.

*To all whom it may concern:*

Be it known that I, WILLIAM B. WELCH, Jr., a citizen of the United States, residing at Los Angeles, in the county of Los Angeles and State of California, have invented new and useful Improvements in Washer - Retainers, of which the following is a specification.

This invention relates to an improvement on my washer retainer which is shown and described in my pending application No. 386,574, filed August 1st., 1907, and the object of the present invention is to provide a washer retainer which is simple in construction and which may be manufactured economically from a small piece of metal by a simple stamping or forming operation.

I accomplish the above object by means of the device described herein and illustrated in the accompanying drawings in which:—

Figure 1,—is a perspective view of my improved washer retainer. Fig. 2,—is a view of the blank from which the washer retainer is formed. Fig. 3,—is a sectional view of a hose coupling showing my improved washer retainer in place therein. Fig. 4,—is a perspective view of a modified form of retainer formed from resilient wire.

Referring to the drawings 5 designates a sheet of metal which is initially stamped into the configuration shown in Fig. 2 and which is preferably composed of spring brass or equivalent material. A body or resilient base portion 6 is bent into a circular form as shown in Fig. 1, the ends of this circular portion coming closely together when the retainer is placed inside a hose coupling. Extending upwardly from body portion 6 are two fingers 7 which are turned outwardly on their upper ends to form lugs 8 which fit over washer 9 as shown in Fig. 3, and hold the same in place. In the construction of this retainer it is only necessary that circular body portion 6 be formed to such a diameter that it will expansively hold itself in hose coupling 10 when placed therein, the relative placement cut 11 having no bearing on the efficiency of the retainer. Thus it will be noted that my retainer may be used for any size of coupling, within certain limits, as it may be bent with the fingers to fit tightly into a coupling of larger or smaller diameter than its normal size. When once in place the resilient pressure of circular portion 6 will efficiently hold the retainer and the washer in place in the hose coupling against all accidental displacement and will thereby insure the washer against loss.

In Fig. 4 I have shown a modified form of retainer which is designed to be constructed of a single piece of resilient wire bent into the same general shape as the form shown in Fig. 1, lugs 8 being formed on the upper ends of fingers 7 which are united at their lower ends by a semi-circular portion 12 corresponding to member 6 of the form of Fig. 1. This form can be manufactured very inexpensively as it requires only a forming operation to place the wire in the configuration shown. Lugs 8 may be flattened if necessary so that they will not project an excessive distance above the washer upon which they rest.

From the foregoing description it will be seen that I have provided a washer retainer which is simple in construction and which may be inexpensively manufactured from a sheet or wire which possesses the necessary qualities, namely,—resiliency and resistance to corrosion by water. It will further be noted that a retainer constructed as illustrated may be used for various sizes of couplings with equal efficiency, thus obviating the necessity of having a different size of retainer for every different size of hose coupling.

Having described my invention what I claim as new and desire to secure by Letters Patent is:—

1. As a new article of manufacture a hose washer retainer formed of a single piece of spring wire, said wire being bent so as to form a spring segmental in configuration, portions of said wire extending at right angles to the plane of said spring portion, the ends of said portions being bent outwardly to form washer engaging lugs.

2. As a new article of manufacture a hose washer retainer formed of a single piece of spring wire, said wire being bent so as to form a spring segmental in configuration, straight portions of said wire extending at right angles to the plane of said spring portion, the ends of said straight portions being bent outwardly and flattened to form washer retaining lugs.

3. A washer retainer composed of a single piece of resilient metal and comprising a body portion formed of a portion bent into a circular segmental configuration, a plurality of fingers extending from said portion at right angles to the circular plane, and outwardly extending lugs on the upper end of said fingers, said lugs adapted to engage the washer and retain the same in place.

4. A washer retainer, comprising a segmental body portion, a plurality of fingers extending from the body portion at approximately right angles to the plane thereof, and outwardly extending lugs on the ends of the fingers, the lugs adapted to engage a washer and retain it in place.

In witness that I claim the foregoing I have hereunto subscribed my name this 3rd day of January, 1908.

WILLIAM B. WELCH, Jr.

Witnesses:
   EDMUND A. STRAUSE,
   OLLIE PALMER.